(12) United States Patent
Wang et al.

(10) Patent No.: US 10,791,066 B2
(45) Date of Patent: *Sep. 29, 2020

(54) VIRTUAL NETWORK

(71) Applicant: Hewlett Packard Enterprise Development LP, Houston, TX (US)

(72) Inventors: Songbo Wang, Beijing (CN); Tao Lin, Beijing (CN); Yinfei Zhang, Beijing (CN); Weichun Ren, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,967

(22) Filed: May 7, 2019

(65) Prior Publication Data

US 2019/0260693 A1 Aug. 22, 2019

Related U.S. Application Data

(63) Continuation of application No. 14/895,189, filed as application No. PCT/CN2014/081042 on Jun. 27, 2014, now Pat. No. 10,298,519.

(30) Foreign Application Priority Data

Jul. 2, 2013 (CN) .......................... 2013 1 0277240

(51) Int. Cl.
*H04L 12/28* (2006.01)
*H04L 12/931* (2013.01)
(Continued)

(52) U.S. Cl.
CPC .......... *H04L 49/354* (2013.01); *H04L 12/462* (2013.01); *H04L 41/0893* (2013.01);
(Continued)

(58) Field of Classification Search
CPC ........... H04L 29/0653; H04L 29/06095; H04L 49/3009; H04L 49/309; H04L 45/74
See application file for complete search history.

(56) References Cited

U.S. PATENT DOCUMENTS 9,178,715 B2  11/2015  Jain et al.
2002/0080800 A1  6/2002  Lee et al.
(Continued)

FOREIGN PATENT DOCUMENTS

CN  101119276 A  2/2008
CN  102571738 A  7/2012
(Continued)

OTHER PUBLICATIONS

International Search Report and Written Opinion dated Sep. 24, 2014, PCT Patent Application No. PCT/CN2014/081042 dated Jun. 27, 2014, ISA/CN.
(Continued)

*Primary Examiner* — Siren Wei
(74) *Attorney, Agent, or Firm* — Hewlett Packard Enterprise Patent Department

(57) ABSTRACT

A SDN controller receives a forwarding request message including a header portion of a layer-2 packet. The SDN controller determines whether a source host and a destination host of the layer-2 packet are in the same virtual network according to a virtual network table.

15 Claims, 10 Drawing Sheets

(51) Int. Cl.
  *H04L 12/46* (2006.01)
  *H04L 29/08* (2006.01)
  *H04L 12/24* (2006.01)
  *H04L 12/721* (2013.01)
  *H04L 12/741* (2013.01)
  *H04L 12/911* (2013.01)

(52) U.S. Cl.
  CPC .............. *H04L 41/12* (2013.01); *H04L 45/66* (2013.01); *H04L 45/74* (2013.01); *H04L 47/82* (2013.01); *H04L 69/324* (2013.01)

(56) References Cited

U.S. PATENT DOCUMENTS

| | | |
|---|---|---|
| 2007/0022474 A1 | 1/2007 | Rowett et al. |
| 2010/0257263 A1 | 10/2010 | Casado et al. |
| 2011/0299533 A1 | 12/2011 | Yu et al. |
| 2011/0317701 A1 | 12/2011 | Yamato et al. |
| 2012/0275328 A1 | 11/2012 | Iwata et al. |
| 2012/0324442 A1 | 12/2012 | Barde |
| 2013/0070762 A1 | 3/2013 | Adams et al. |
| 2013/0103817 A1* | 4/2013 | Koponen ............ G06F 9/45558 709/223 |
| 2013/0195113 A1* | 8/2013 | Kotha ............... H04L 45/64 370/401 |
| 2013/0250770 A1* | 9/2013 | Zou ................. H04L 41/12 370/238 |
| 2013/0301425 A1* | 11/2013 | Udutha ............. H04L 12/467 370/242 |
| 2014/0119367 A1* | 5/2014 | Han ................. H04L 12/4633 370/389 |

FOREIGN PATENT DOCUMENTS

| | | |
|---|---|---|
| CN | 102739549 A | 10/2012 |
| CN | 102857416 A | 1/2013 |
| CN | 103081418 A | 5/2013 |
| WO | 2013/015825 A1 | 1/2013 |

OTHER PUBLICATIONS

U.S. Appl. No. 61/720,326 Provisional Specification.
Software Defined Networking (SDN) in the Enterprise, Enterasys Networks, Inc., Jul. 27, 2012.
"Multi-tenant traffic in virtualized network environments", sFlow, Apr. 22, 2013.
Ethernet-based Software Defined Network (SDN), J.F. Juan, Jun. 2, 2013.
"Big Virtual Switch", Big Switch Networks, Inc., Aug. 1, 2013.
"Award-winning Software-defined Networking ProgrammableFlow Controller", NEC Corporation, Aug. 8, 2012.

\* cited by examiner

Virtual Network ID: Rose

Gateway: 192.168.10.1

Gateway Mask: 255.255.255.0

Instance ID : VM-A

Mac address:00.00.00.00.00.01

Instance ID : VM-B

Mac address:00.00.00.00.00.02

Instance ID : VM-A'

Mac address:00.00.00.00.00.03

Instance ID : VM-B'

Mac Address : 00.00.00.00.04

Policy-ID: Rose-Policy-test1

VM-A deny VM-B;

Fig.4

| No. | SMAC | DMAC | Action | Egress Port |
|---|---|---|---|---|
| 1 | 00.00.00.00.00.01 | 00.00.00.00.00.03 | Forwarding | 90a |
| 2 | 00.00.00.00.00.03 | 00.00.00.00.00.01 | Forwarding | 100a |
| ...... | ...... | ...... | ...... | ...... |

Fig.6

| No. | SMAC | DMAC | Action | Egress Port |
|---|---|---|---|---|
| 1 | 00.00.00.00.00.01 | 00.00.00.00.00.03 | Dropping | NA |
| ...... | ...... | ...... | ...... | ...... |

Fig.7

| No. | SMAC | DMAC | Action | Egress Port |
|---|---|---|---|---|
| 1 | 00.00.00.00.00.05 | 00.00.00.00.00.02 | Forwarding | 90b |
| 2 | 00.00.00.00.00.02 | 00.00.00.00.00.05 | Forwarding | 101d |
| 3 | 00.00.00.00.00.05 | 00.00.00.00.00.03 | Forwarding | 101a |
| 4 | 00.00.00.00.00.03 | 00.00.00.00.00.05 | Forwarding | 101d |
| ...... | ...... | ...... | ...... | ...... |

Fig.10

VIRTUAL NETWORK

BACKGROUND

An enterprise network may include a core network connected with a plurality of virtual local area networks (VLANs). The VLANs may for example be of the type defined by 802.1Q. Hosts, such as virtual machines, in a same VLAN may communicate with each other on layer-2. Hosts belonging to different VLANs may be capable of communicating with each other on layer-3, such as IP communication, instead of layer-2.

BRIEF DESCRIPTION OF THE DRAWINGS

FIG. 4 is an example of a virtual network table.

FIG. 6 is an example a flow table.

FIG. 7 is another example of a flow table.

FIG. 10 is an example of an updated flow table.

DETAILED DESCRIPTION

Figure 1:
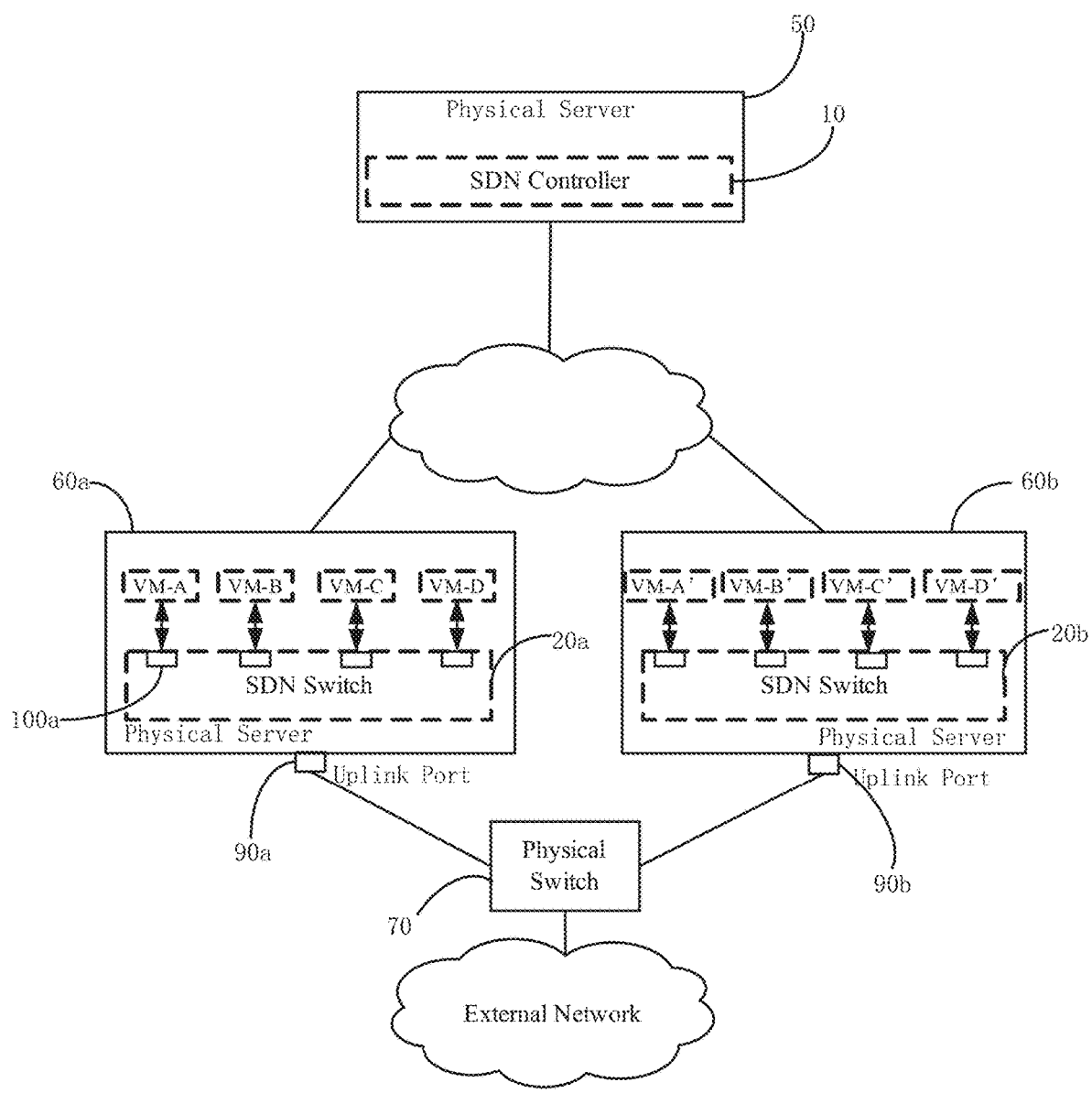
FIG. 1 is an example of an infrastructure of a virtual network system.

FIG. 1 is an example of an infrastructure of a virtual network system. The layer-2 communication in a virtual network may be controlled by a SDN controller and a SDN switch. OpenFlow protocol is a currently popular SDN technology, and will be taken as the example hereinafter. However, it is to be noted that other protocols capable of achieving the SDN functions may also be adopted. In an example, the system includes an SDN controller 10 ("controller 10") deployed on a first physical server 50, and SDN switches 20a, 20b ("switches 20a, 20b") respectively deployed on a second physical server 60a and a third physical servers 60b. The system also includes virtual machines VM-A, VM-B, VM-C, and VM-D deployed on the second physical server 60a, and the virtual machines VM-A', VM-B', VM-C', and VM-D' deployed on the third physical server 60b. The switches 20a, 20b connect to an external physical switch 70 via uplink ports 90a, 90b. At the same time, the switches 20a, 20b connect to each of the virtual machines via downlink ports, such as downlink port 100a.

Figure 2:
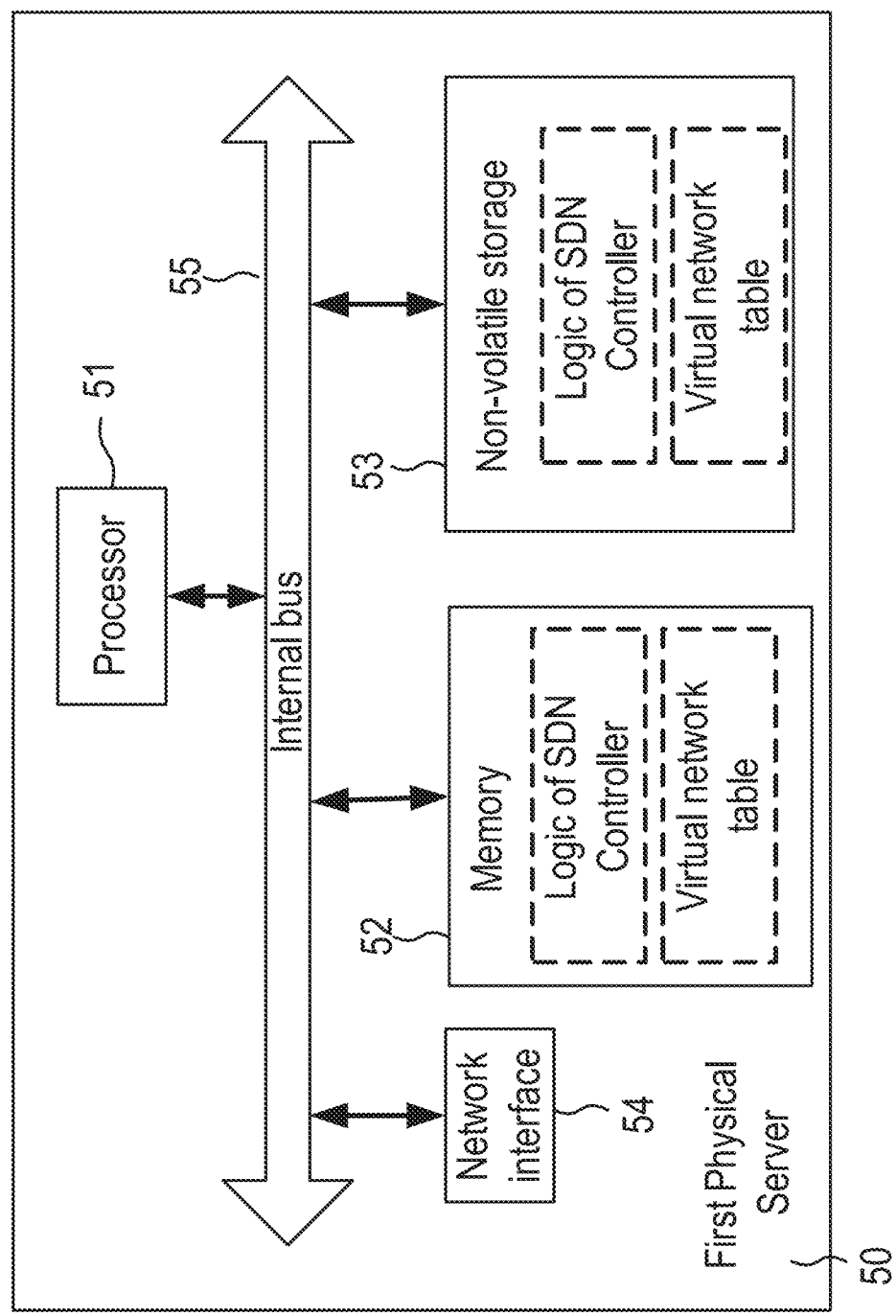
FIG. 2 is a block diagram of an example of software defined network (SDN) controller.
Figure 3:
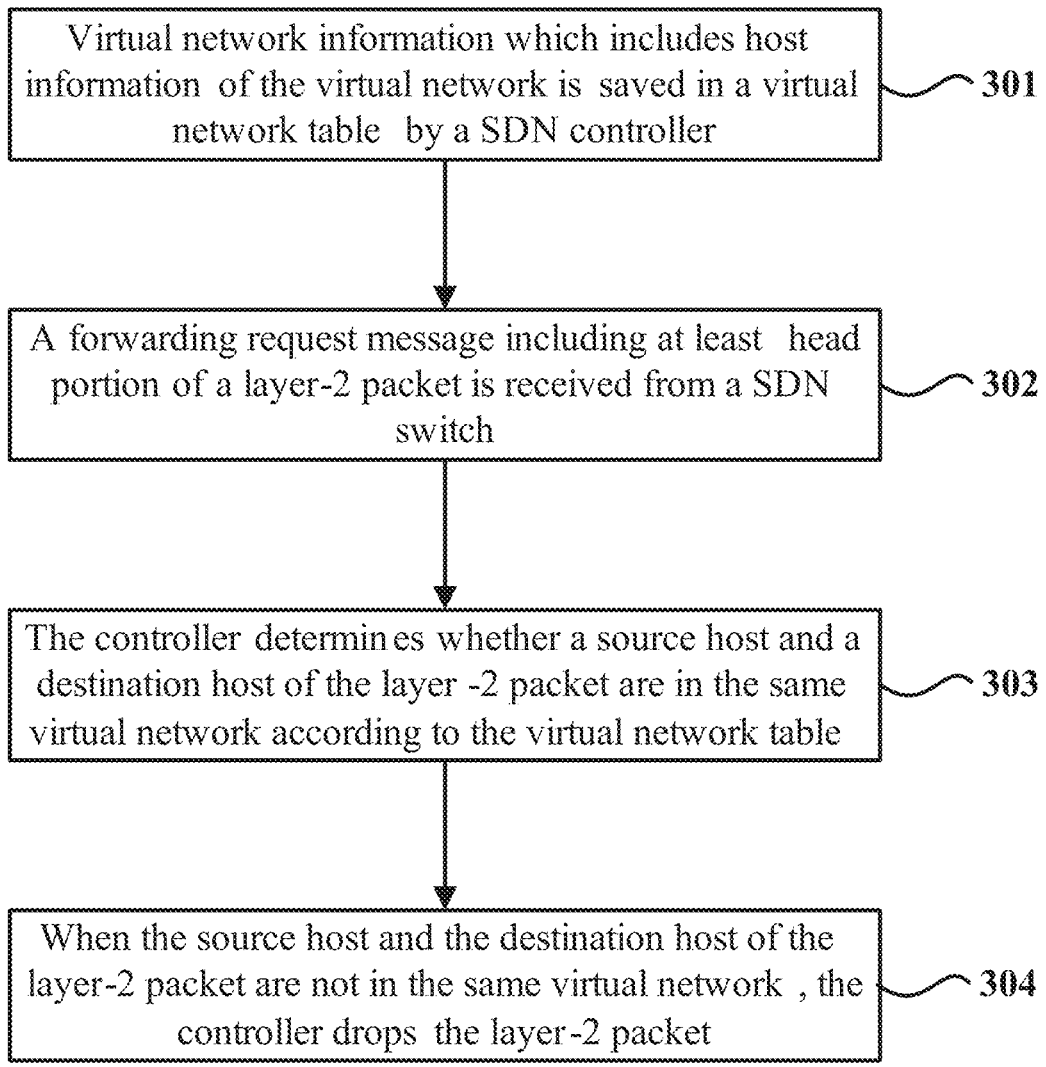
FIG. 3 is an example flowchart of layer-2 packet processing method.

Referring to FIGS. 2 and 3, in an example, the controller 10 is implemented on a first physical server 50. The first physical server 50 includes a processor 51, a memory 52, a non-volatile storage (e.g. NVRAM) 53 and a network interface 54 and these components may be connected via internal bus 55. The SDN controller and the method described in this controller may be implemented by an instruction set, i.e., machine-readable instructions which are executed by the processor 51. The machine readable instructions may include controller logic and may be stored in the non-volatile storage 53. The processor 51 may fetch the machine readable instructions from the NVRAM 53 into the memory 52 and then execute the method. FIG. 3 is an example flowchart of layer-2 packet forwarding method including the following blocks.

At block 301, virtual network information including host information is received and saved in a virtual network table.

At block 302, a forwarding request message including at least a header portion of a layer-2 packet is received from the SDN switch.

At block 303, a determination is made regarding whether a source host and a destination host of the layer-2 packet are in the same virtual network according to the virtual network table.

Upon determining that the source host and the destination host of the layer-2 packet are not in the same virtual network, at block 304, the controller 10 drops the layer-2 packet.

In an example, the hosts may be VM-A, VM-B, VM-C, and VM-D deployed on the second physical server 60a, and also VM-A', VM-B', VM-C', and VM-D' deployed on the third physical server 60b. An administrator may define a first virtual network "Rose" and a second virtual network "Tom". Virtual machines VM-A, VM-B, VM-A' and VM-B' belong to the first virtual network, and virtual machines VM-C, VM-D, VM-C', VM-D' belong to the second virtual network. The host information of each virtual network may include ID and MAC address of the virtual machines. It can be understood that the virtual network information may be updated when there is a new virtual machine intending to join the virtual network.

When the VM-A sends the layer-2 packets, such as Ethernet packets, to VM-C, the first layer-2 packet is transmitted to the downlink port 100a of switch 20a.

The switch 20a is a virtual switch deployed on the second server 60a. The switch 20a searches its flow table and determines whether the first layer-2 packet matches any of flow entries in the flow table. If no matching flow entry is found, the switch 20a may send a forwarding request message to the controller 10. In an example, the forwarding request message may be a packet-in message defined by OpenFlow protocol. The forwarding request message may include at least the header portion of the layer-2 packets sent by VM-A.

After receiving the forwarding request message, the controller 10 may determine whether the access event is allowable according to the header portion of the layer-2 packet. The determination is made in accordance with a source MAC address and a destination MAC address. Upon determining that the source MAC address and destination MAC address are not within the same virtual network, the controller 10 may drop the layer-2 packets. That is, VM-A and VM-C are not capable of communicating with each other on layer-2. It can be understood that VM-A is capable of performing a layer-3 communication with VM-C when a layer-3 route exists.

The above example contributes to the virtual network configuration for the reason that more than 4096 VLANs may be defined. More than 4096 VLANs may be defined because the virtual network table stores information indicating which hosts are in which VLAN. Thus packets sent from the hosts need not carry a VLAN tag as the VLAN of the host may be determined by the SDN controller based on host information in the virtual network table. While in many cases a VLAN tag is limited to 4096 VLANs, the virtual network table may be able to support more VLANs. Also, as the 12-bit VLAN ID need not be carried by the layer-2 packet, the overall transmission efficiency may be enhanced.

Though hosts in the same virtual network are capable of communicating with each other on layer-2, an exceptional rule for prohibiting such layer-2 communication may be configured. For instance, the layer-2 communication between VM-A and VM-B is prohibited although the two hosts are in the same virtual network "Rose". FIG. 4 is an example of a virtual network table. The virtual network information is described in JavaScript Object Notation (JSON) format. The term "virtual Network ID" relates to the ID of the virtual network, such as Rose. The term "Instance ID" relates to the ID of the virtual machine, such as VM-A. There are four virtual machines respectively indicated by VM-A, VM-B, VM-A', and VM-B'. The MAC addresses of the virtual machines are described after "Instance ID." For instance, the MAC addresses of the virtual machine with "Instance ID" equaling to VM-A is "00.00.00.00.00.01". The virtual network information may further include the term "Policy-ID", which indicates an access policy identifier relating to the virtual network. For example, "VLAN-Policy-test1" includes an access policy entry "VM-A deny VM-B" defining that layer-2 communication between the virtual machines VM-A and VM-B are prohibited. It can be understood that the access policy may be defined in accordance with real scenarios.

Figure 5:
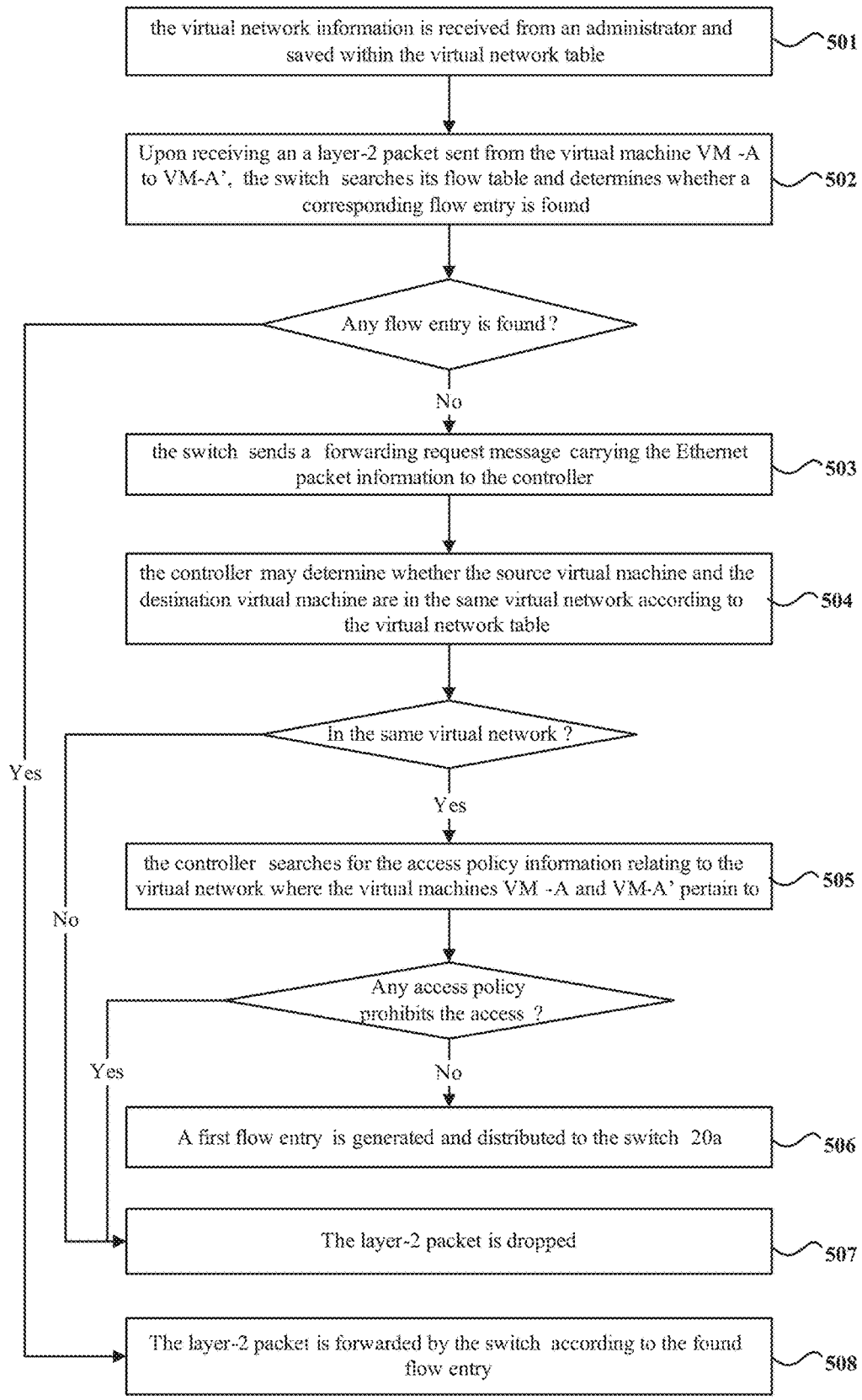
FIG. 5 is another example flowchart of layer-2 packet processing method.

FIG. 5 is another example flowchart of layer-2 packet processing method. In an example, also referring to FIG. 1, the access from the virtual machine VM-A on Server 60*a* to VM-A' on server 60*b* will be described hereinafter.

At block 501, the virtual network information is received and saved in the virtual network table. The virtual network information may include the virtual machine information and the access policy defining the access between the virtual machines within the same virtual network. The virtual machine information may include ID and MAC address of the virtual machines.

Upon receiving a layer-2 packet sent from the virtual machine VM-A, at block 502, the switch 20*a* searches its flow table and determines whether a corresponding flow entry is found. Upon determining that a flow entry is found, at block 508, the layer-2 packet is forwarded by the switch 20*a* according to the found flow entry, and the process ends. Otherwise, a default entry is selected, and the process goes to block 503.

At block 503, the switch 20*a* sends a forwarding request message to the controller 10. In an example, the forwarding request message contains at least the header portion of the packet.

After receiving the forwarding request message, at block 504, the controller 10 may determine whether the source virtual machine and the destination virtual machine are in the same virtual network according to the virtual network table. If yes, the process goes to block 505. Otherwise, at block 507, the packet is dropped.

At block 505, the controller 10 searches for the access policy relating to the virtual networks where the virtual machines VM-A and VM-A' belong to. After identifying the corresponding access policy, at block 507, the controller 10 may determine to drop the packet when the access policy prohibiting the access between the virtual machines VM-A and VM-A'.

If there is no access policy prohibiting the access between the virtual machines VM-A and VM-A', at block 506, the controller 10 may generate a first flow entry, and may distribute the first flow entry to the switches 20*a*. FIG. 6 is an example a flow table showing the first flow entry. Flow characteristics of the first flow entry may include a source MAC address (SMAC), a destination MAC address (DMAC). The first flow entry may also include an action, and an "Egress Port". The SMAC is the MAC address of the source virtual machine (VM-A), which is "00.00.00.00.00.01" in this example. The DMAC is the MAC address of the destination virtual machine (VM-A'), which is "00.00.00.00.00.03" in this example. The egress port relates to the uplink port 90*a* connecting to the physical switch 70. The action of the first flow entry is to forwarding the matched packets via the uplink port 90*a* of the switch 20*a*.

In another example, at block 505, a second flow entry relating to the access from the destination virtual machine (VM-A') to the source virtual machine (VM-A) may be generated at the same time, and the second flow entry may be distributed to the switch 20*a*. The second flow entry shown in FIG. 6 is generated if there is an access policies allowing the layer-2 communication between the destination virtual machine (VM-A') and the source virtual machine (VM-A). The flow characteristics of the second flow entry may include SMAC, DMAC. The second flow entry may also include an action, and an "Egress Port". The SMAC is the MAC address of the destination virtual machine (VM-A'), which is "00.00.00.00.00.03" in this example. The DMAC is the MAC address of the source virtual machine (VM-A), which is "00.00.00.00.00.01" in this example. The egress port is the downlink port 100*a* of the switch 20*a*. The action of the second flow entry action is to forwarding the matched packets via the downlink port 100*a* of the switch 20*a*.

As mentioned in the above example, when the source virtual machine and the destination virtual machine of the packet are not in the same virtual network, the packet may be dropped. A virtual machine trying to initial layer-2 communication with another virtual machine in a different virtual network may relate to packets sent by an attacker. In another example, the controller may generate a third flow entry to prevent such packets continually sent to the controller. The third flow entry shown in FIG. 7 may be generated when an access policy prohibiting the layer-2 communication between the source virtual machine (VM-A) and the destination virtual machine (VM-A'). The flow characteristics of the third flow entry are the same with that of the first flow entry. The difference resides in that the action defined in the third flow entry is to dropping the matched packets.

In an example, the switch may be a virtual switch supporting the forwarding mode of Virtual Ethernet Port Aggregator (VEPA). The switch 20*a* processes the packets according to the distributed flow entries.

The first flow entry generated at block 506 has explicitly defined the uplink port as the egress port of the packet. When the flow entry is distributed, the uplink port information is carried in a forwarding response message sent from the controller 10 to the switch 20*a*. In an example, the forwarding response message is a packet-out message according to OpenFlow protocol. As such, the switch 20*a* deployed on the server 60*a* may forward the packets with the same flow characteristics according to the distributed flow entry.

The above example illustrates how switch 20*a* forwards the packets sent from the virtual machine VM-A to VM-A'. It can be understood that similar packet forwarding process can be performed by the switch 20*b*. The difference may reside in the details of the found or generated entries.

Figure 8:
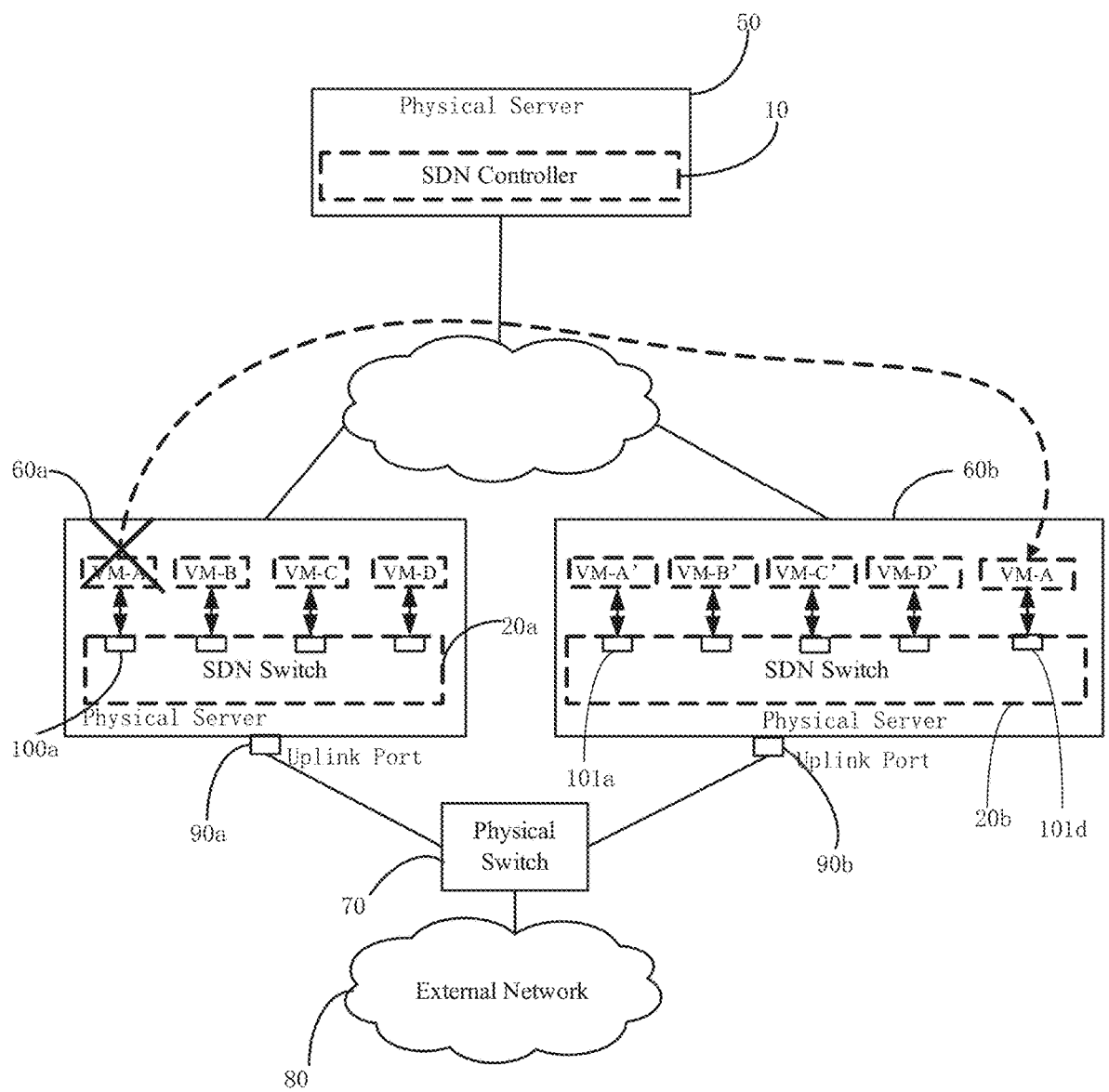
FIG. 8 is an example showing the migration of virtual machine.
Figure 9:
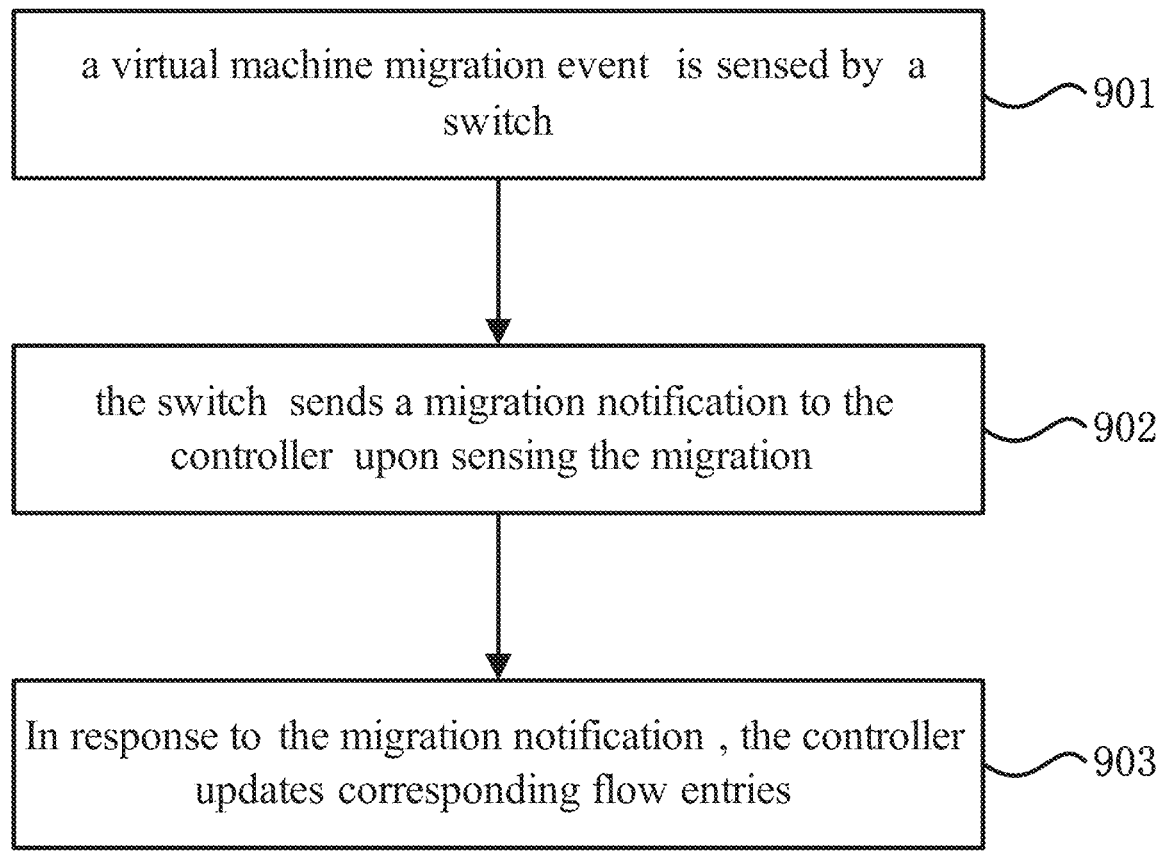
FIG. 9 is an example flowchart illustrating the flow entry updating process for virtual machine migration.

In another example, a virtual machine migration may be initiated by an administrator. The migration is transparent to the hosts needing the services provided by the virtual machine. FIG. 8 is an example showing the migration, in which VM-A migrates from the second physical server 60*a* to the third physical server 60*b*. FIG. 9 is an example flowchart illustrating the flow entry updating process for virtual machine migration.

At block 901, for instance, a virtual machine migration event, such as a virtual machine migrating from server 60*a* to server 60*b*, may be sensed by the switch 20*b*.

In block 902, the switch 20*b* sends a migration notification to the controller 10 upon sensing the migration.

After receiving the migration notification, at block 903, the controller 10 updates the corresponding flow entries.

In an example, when the virtual machine VM-A migrates from Server 60*a* to Server 60*b*, the services provided by the virtual machine VM-A remain. As the physical server on which the virtual machine VM-A is deployed and the connected switch have been changed, the flow entries relating to the access from the virtual machine VM-A to VM-B, VM-A', and VM-B' are also different. Thus, the layer-2 packets may not be forwarded according to the original flow entries.

For this reason, in response to the migration notification, the controller 10 may update the flow entries relating to the migrated virtual machine and other virtual machines located in the same virtual network. In addition, the updated flow entries may be further distributed to the currently connected switch, for instance, the switch 20*b*. The example updated flow table is shown in FIG. 10. As shown, according to the updated flow entries, the layer-2 packet sent from VM-B to VM-A may be forward through the port 101*d*. On the opposite direction, the layer-2 packet sent from VM-A to VM-B may be forward through the port 90*b*. The layer-2 packet sent from VM-A' to VM-A may be forward through the Egress port "101*d*." On the opposite direction, the layer-2 packet sent from VM-A to VM-A' may be forward through the port 101*a*.

The foregoing descriptions are only examples of the present disclosure and are not for use in limiting the protection scope thereof. Any modification, equivalent replacement and improvement made under the spirit and principle of the present disclosure should be included in the protection scope thereof.

The invention claimed is:

1. A communication method, comprising:
    saving virtual network information comprising host information in a virtual network table by a software defined network (SDN) controller;
    receiving, from a SDN switch, a forwarding request message comprising at least a header portion of a layer-2 packet;
    determining whether a source host and a destination host of the layer-2 packet are in the same virtual network according to the virtual network table;
    dropping the layer-2 packet when the source host and the destination host of the layer-2 packet are not in the same virtual network;
    searching for access policy information if the source host and the destination host of the layer-2 packet are in the same virtual network;
    dropping the layer-2 packet if the access policy information prohibits access between the source host and the destination host;
    generating a flow entry if the access policy information does not prohibit access between the source host and the destination host; and
    distributing the flow entry to one or more SDN switches.

2. The method of claim 1, wherein the host information comprises MAC address of the hosts for determining whether the source host and the destination host are in the same virtual network.

3. The method of claim 2, wherein the virtual network information comprises an access policy, the method further comprises:
    generating, by the SDN controller, a first flow entry for the SDN switch when the access policy allows an access event between the source host and the destination host; and
    the first flow entry comprising a source MAC address, a destination MAC address, a forwarding action and an egress port, and the source MAC address and the destination MAC address are respectively the MAC address of the source host and the destination host.

4. The method of claim 3, further comprising:
    generating, by the SDN controller, a second flow entry for the SDN switch when the access policy allows the access event between the source host and the destination host; and
    the second flow entry comprising a source MAC address, a destination MAC address, a forwarding action and an egress port, and the source MAC address and the destination MAC address are respectively the MAC address of the destination host and the source host.

5. The method of claim 4, further comprising:
    generating, by the SDN controller, a third flow entry for the SDN switch when the access policy prohibits an access event between the source host and the destination host;
    the third flow entry comprising a source MAC address, a destination MAC address, a dropping action, and the source MAC address and the destination MAC address are respectively the MAC address of the source host and the destination host.

6. The method of claim 1, wherein the host is a virtual machine, the method further comprising:
    receiving, by the SDN controller, a migration notification from a SDN switch; and
    updating migrated virtual machine information in the virtual network table and corresponding flow entries in response to the migration notification.

7. A software defined network (SDN) server, comprising:
    a processor;
    a storage coupled to the processor;
    machine readable instructions stored on the storage and executable by the processor to:
        save virtual network information comprising host information in a virtual network table;
        receive a forwarding request message comprising at least a header portion of a layer-2 packet from a SDN switch;
        determine whether a source host and a destination host of the layer-2 packet are in the same virtual network according to the virtual network table;
        drop the layer-2 packet when the source host and the destination host of the layer-2 packet are not in the same virtual network;
        search for access policy information if the source host and the destination host of the layer-2 packet are in the same virtual network;
        drop the layer-2 packet if the access policy information prohibits access between the source host and the destination host;

generate a flow entry if the access policy information does not prohibit access between the source host and the destination host; and distribute the flow entry to one or more SDN switches.

8. The server of claim 7, wherein the host information comprises MAC address of the hosts for determining whether the source host and the destination host are in the same virtual network.

9. The server of claim 8, wherein the virtual network information further comprises at least one access policy, and the machine readable instructions are further to:

generate a first flow entry for the SDN switch when the access policy allows an access event between the source host and the destination host; and the first flow entry comprising a source MAC address, a destination MAC address, a forwarding action and an egress port, and the source MAC address and the destination MAC address are respectively the MAC address of the source host and the destination host.

10. The server of claim 9, wherein the machine readable instructions are further to:

generate a second flow entry for the SDN switch when the access policy allows the access event between the source host and the destination host; and the second flow entry comprising a source MAC address, a destination MAC address, a forwarding action and an egress port, and the source MAC address and the destination MAC address are respectively the MAC address of the destination host and the source host.

11. The server of claim 8, wherein the machine readable instructions are further to:

generate a third flow entry for the SDN switch when the access policy prohibits an access event between the source host and the destination host;

the third flow entry comprising a source MAC address, a destination MAC address, a dropping action, and the source MAC address and the destination MAC address are respectively the MAC address of the source host and the destination host.

12. The server of claim 7, wherein the host is a virtual machine, the machine readable instructions are further to:

receive a migration notification from a SDN switch, update migrated virtual machine information in the virtual network table and corresponding flow entries in response to the migration notification.

13. A non-transitory machine-readable storage medium storing machine readable instructions which are executable by a processor, the machine-readable storage medium comprising:

instructions to save virtual network information comprising host information in a virtual network table instructions to receive a forwarding request message comprising at least a header portion of a layer-2 packet received from a software defined network (SDN) switch;

instructions to determine whether a source host and a destination host of the layer-2 packet are in the same virtual network according to the virtual network table;

instructions to drop the layer-2 packet when the source host and the destination host of the layer-2 packet are not in the same virtual network instructions to search for access policy information if the source host and the destination host of the layer-2 packet are in the same virtual network;

instructions to drop the layer-2 packet if the access policy information prohibits access between the source host and the destination host;

instructions to generate a flow entry if the access policy information does not prohibit access between the source host and the destination host; and instructions to distribute the flow entry to one or more SDN switches.

14. A non-transitory machine-readable storage medium of claim 13, wherein the virtual network information comprises an access policy and the machine readable instructions comprise:

instructions to generate a first flow entry for the SDN switch when the access policy allows an access event between the source host and the destination host; and wherein the first flow entry comprises a source MAC address, a destination MAC address, a forwarding action and an egress port, and the source MAC address and the destination MAC address are respectively the MAC address of the source host and the destination host.

15. A non-transitory machine-readable storage medium of claim 13, wherein the host is a virtual machine and the machine readable instructions comprise instructions to:

receive a migration notification from a SDN switch; and update the migrated virtual machine information in the virtual network table and the corresponding flow entries relating to the migrated virtual machine in response to the migration notification.

\* \* \* \* \*